Sept. 20, 1971    R. GENIN    3,605,334
TOY AUTO DRIVE SIMULATOR
Filed May 26, 1969    2 Sheets-Sheet 1
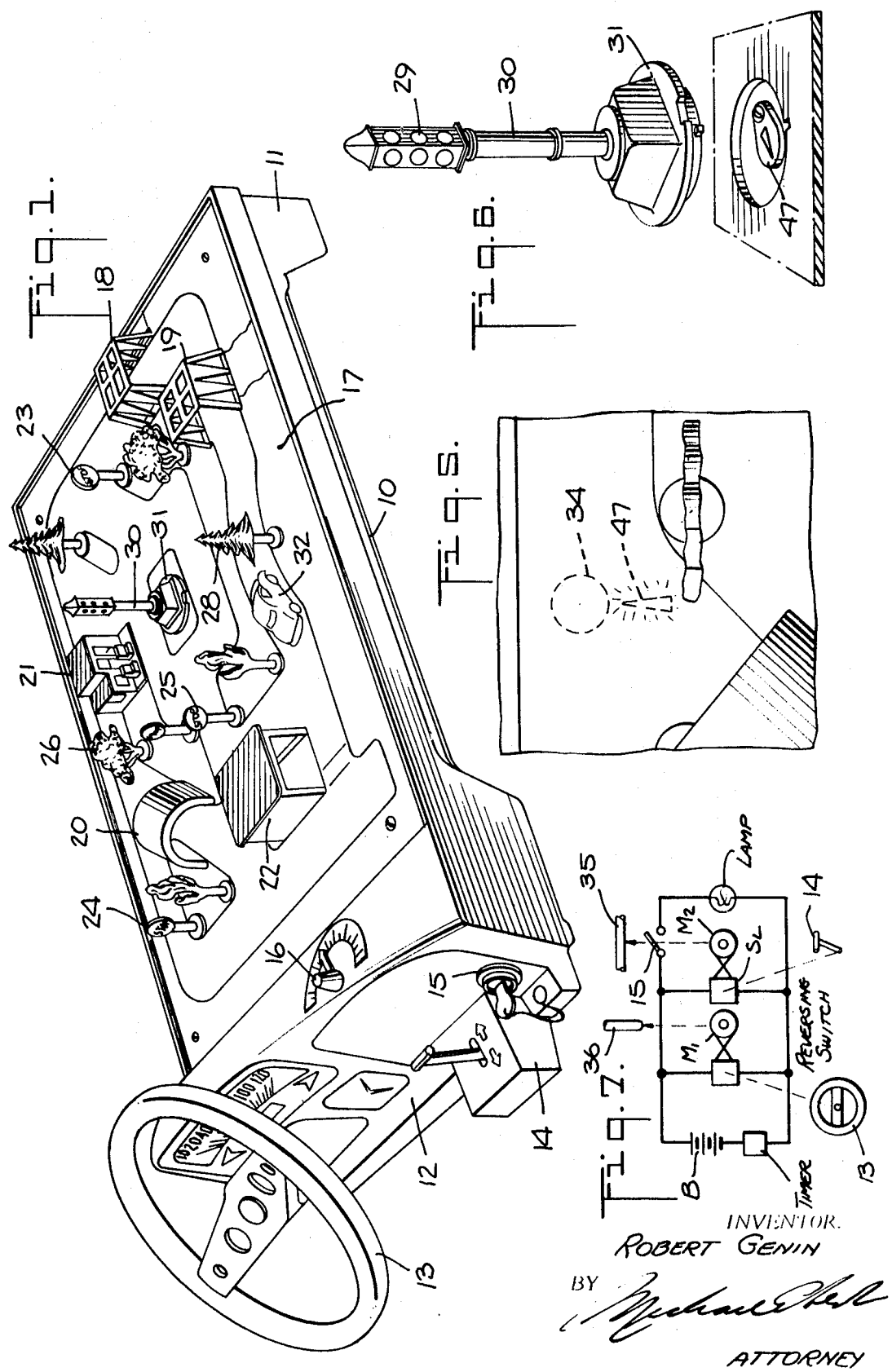
INVENTOR.
ROBERT GENIN
BY
ATTORNEY

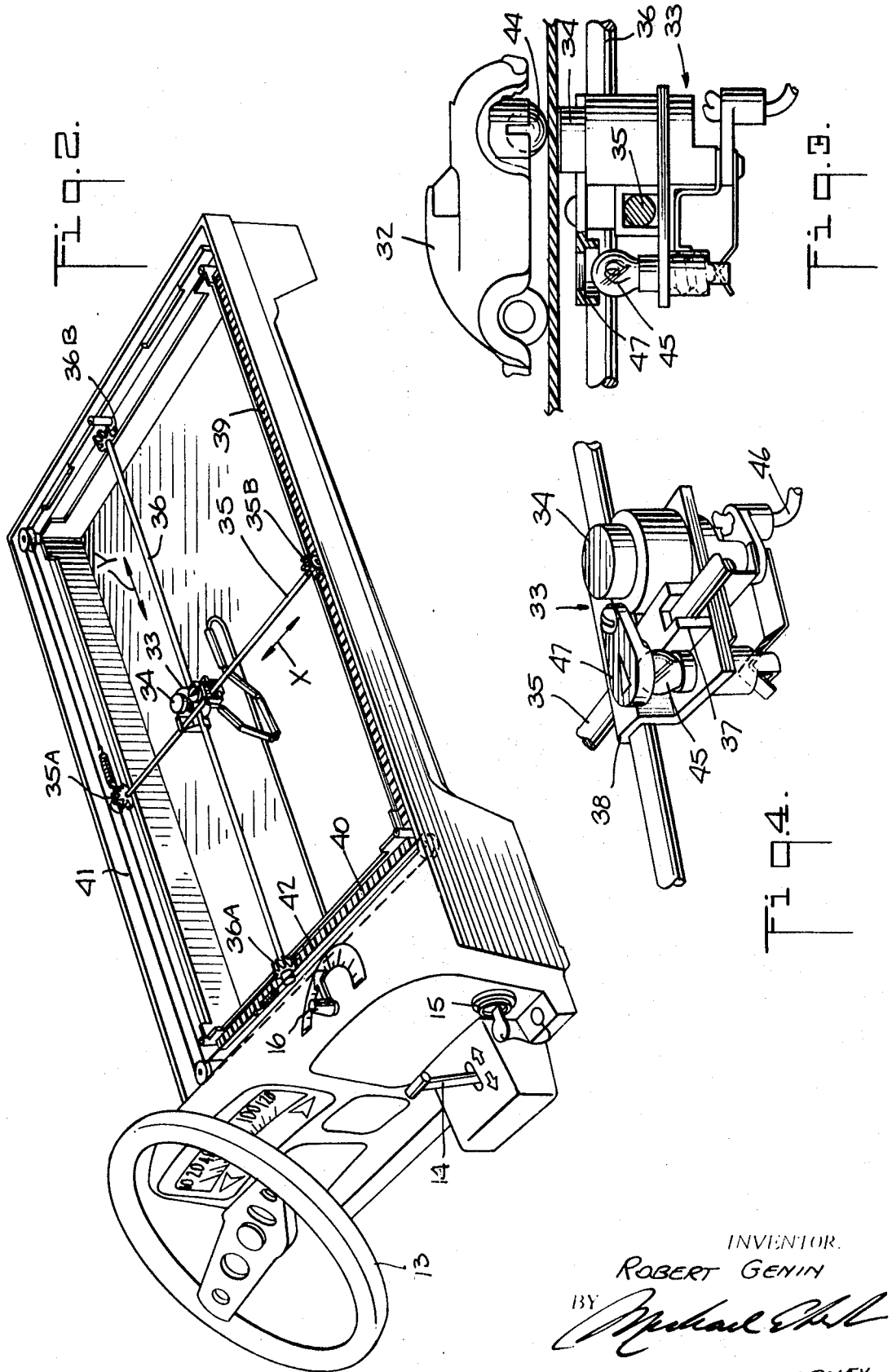

United States Patent Office 3,605,334
Patented Sept. 20, 1971

3,605,334
TOY AUTO DRIVE SIMULATOR
Robert Genin, Scarsdale, N.Y., assignor to Child
Guidance Toys Inc., Bronx, N.Y.
Filed May 26, 1969, Ser. No. 827,545
Int. Cl. A63h 29/22
U.S. Cl. 46—240
5 Claims

ABSTRACT OF THE DISCLOSURE

A toy auto drive simulator in which the movement of a miniature auto on a scenic board having various routes thereon is controlled by a hidden carriage underlying the board. The carriage is movable under the control of a driver in the X and Y coordinates, and carries a permanent magnet. The magnet is positioned adjacent the underside of the board and acts to attract a ball bearing held captive in a socket under the front end of the auto, whereby as the carriage moves in any direction, the auto is caused to follow suit. Inasmuch as the auto is magnetically coupled to the carriage, the linkage is invisible. In order, therefore, to make it possible to place an auto on the board so as to couple it to the magnet, regardless of carriage position, the carriage is provided with an illuminated arrow which points to the magnet. The arrow is visible through the board, which is made of semi-translucent material.

---

This invention relates generally to a toy auto drive simulator, and more particularly to a simulator in which a toy auto placed on a board having various routes thereon, is magnetically linked to a carriage underlying the board, whereby movement of the carriage under the control of the driver causes corresponding movement of the auto.

Children enjoy toys which simulate the driving of automotive and other vehicles, for this experience is imitative of adult driving functions. Accordingly, it is the main object of this invention to provide an auto drive simulator by which a child at a dashboard is able to steer and thereby control the movement of a miniature car along various roads.

A more specific object of this invention is to provide a simulator of the above type in which a carriage movable in X and Y coordinates under the control of the driver at the dashboard, travels beneath and is obscured by a scenic board on which the routes appear, the carriage being magnetically linked to the auto, whereby movement of the carriage is accompanied by corresponding movement of the auto.

Also an object of the invention is to provide an arrangement which identifies the position of the magnet on the hidden carriage, whereby an auto may readily be coupled thereto.

Briefly stated, these objects are accomplished by an auto drive simulator in which controls mounted on a dashboard act to determine the direction taken by a carriage which is movable under and obscured by a scenic board having various road possibilities. The carriage carries a permanent magnet which is adapted to attract a ferromagnetic element secured to the front end of a car placed on the board, whereby the carriage and car are magnetically linked and movement of the carriage in the X and Y coordinates effects corresponding movement of the car.

The site of the magnet is identified by an illuminated arrow borne by the carriage and visible through the board, which is of semi-translucent material. Access to the bulb on the carriage providing the illumination is by way of a traffic-light post on the board, which is removable to afford an opening therethrough.

For a better understanding of the invention, as well as other objects and further features thereof, reference is made to the following detailed description to be read in conjunction with the accompanying drawings, wherein:

FIG. 1 is a perspective view of an auto drive simulator according to the invention;

FIG. 2 is the same as FIG. 1, with the scenic board removed to expose the underlying carriage;

FIG. 3 is a section taken through the board to show the relationship of the carriage to a miniature car thereabove;

FIG. 4 is a perspective view of the carriage mounted on its rods;

FIG. 5 is a plan view of a portion of the board, showing the illuminated indicator pointing to the carriage magnet;

FIG. 6 shows the removable traffic-light post providing access to the illuminated indicator; and FIG. 7 is the circuit diagram of the system.

Referring now to the drawings, the auto drive simulator in accordance with the invention, comprises a shallow tank 10 supported on legs 11 and provided at its front end with a simulated dashboard 12 from which a steering wheel 13 extends. Also mounted on the dashboard is an operating stick 14 and a key switch 15. Above the dashboard is a control knob 16.

Covering tank 10 is a scenic board 17 having a road pattern printed thereon, the road going through bridges 18 and 19, an underpass 20, and passing by a service station 21 and a garage 22. Placed alongside the road are various stop signs, such as signs 23, 24 and 25, and trees 26, 27 and 28. Also mounted on the board is a traffic light 29 which is supported on a post 30 anchored on a removable hatch cover 31.

The purpose of the toy is to make it possible for an operator at the dashboard to steer a toy car 32 along the routes appearing on board 17 in any desired direction, so that the car may be caused to travel under the bridges, to stop at the service station or at the traffic light, to reverse direction and, if the operator so desires, to crash into any of the objects attached to the board. In order to accomplish this purpose, one must be able to control the movement of the car along the board in a manner comparable to the control obtained with a steering wheel in a standard automobile.

This is effected, as best seen in FIGS. 2, 3 and 4, by a carriage, generally designated by numeral 33, on which is mounted a permanent magnet rod 34. The carriage is supported at the intersection of a first rod 35 movable across the bed in the long direction thereof, and a second rod 36 movable across the bed in the short direction thereof. Rod 35 passes through a guide channel 37 in the carriage, while rod 36 passes through a separate guide channel 38 formed at right angles to channel 37.

The ends of rod 35 terminate in pinions 35A and 35B which ride in racks 39 extending along the long sides of the bed, whereas the ends of rod 36 terminate in pinions 36A and 36B which ride in racks 40 extending along the short sides of the bed.

A pulley-supporting belt 41 is connected to one end of rod 35 to shift the rod along the long side of the belt and thereby move carriage 33 in the Y direction, and a pulley-supporting belt 42 connected to one end of rod 36 serves to move the carriage in the X direction. Simultaneous movement of the rods causes the carriage to move in the diagonal direction.

Each pulley, as shown in FIG. 7, is associated with a battery-operated, direct-current motor. One motor, $M_1$, under the control of a polarity-reversing switch $S_1$, actuated by wheel 13, is operatively coupled to pulley 42 so that when the wheel is turned to the left, the rod 36 pushes carriage 33 to the left, and when the wheel is turned to the right, carriage 33 moves accordingly. The other motor $M_2$ is under the control of stick 14 which actuates a polarity-reversing switch $S_2$, such that in the up-position of the stick, rod 35 pushes carriage 33 to the north, and when in the down-position, to the south.

By simultaneous operation of rods 35 and 36, carriage 33 will move up or down a diagonal depending on the relative directions of the rods associated therewith. Knob 16 controls an electric timer in the battery supplying power to the motors to control the speed of operation. In play, the player is given a route card indicating one of the possible routes the car may take, and indicating maximum time for travel. The timer is set for this maximum time, and then cuts off the power so that the player, if he fails to complete the route in the assigned time, is no longer able to drive the car.

As best seen in FIG. 3, the front end of car 33 is provided with a socket 43 in which a steel ball-bearing 44 is held captive. When the ball-bearing is in line with magnet 34 on the carriage, the magnetic attraction therebetween provides a linkage which causes the car to follow the movement of the carriage. The two wheels and the single ball-bearing provide a three-point support for the car, making it readily possible for the car to reverse direction, for if the carriage is caused to move in a 180° arc, the car will pivot about the rear wheels as the ball-bearing travels through the same arc.

In order to properly place the car on the board with its ball-bearing 44 in alignment with magnet 34, one must locate the magnet. Board 17 is of semi-translucent material which normally obscures both the carriage and the magnet carried thereon. However, also borne on the carriage is an electric-light bulb 45 which is wired by a flexible cable 46 to battery B through the key switch 15, which is spring-loaded. To conserve battery power, the switch is turned on only when it is necessary to locate the magnet.

Placed over bulb 45 is a mask 47 having an arrow-shaped aperture which is pointed toward the magnet. Thus when the light is on, one sees through the semi-translucent board (note FIG. 5), an illuminated arrow, and by placing the ball bearing of the car at the apex of this arrow, one is able to magnetically link the car to the magnet next to the arrow. A loss of linkage will occur when the auto is driven into a barrier while the carriage continues to move, Hence one must be able to locate the magnet to re-link the car thereto.

It may be necessary on occasion to replace bulb 45. In order to do this without removing the entire board, one simply raises the traffic light 29 to remove hatch cover 31 from the board, and thereby provide access to the bulb after the carriage is brought in line with the opening. Mask 47 is pivotally mounted on a post and may be readily shifted aside to expose the bulb. While there has been shown and described a preferred embodiment of toy auto drive simulator in accordance with the invention, it will be appreciated that many changes and modifications may be made therein without, however, departing from the essential spirit of the invention.

I claim:
1. A toy auto drive simulator comprising:
   (A) a carriage having a magnet thereon,
   (B) a semi-translucent board overlying the carriage, said board having a road pattern formed thereon,
   (C) means under the control of an operator to shift the carriage in any direction to any point within the boundaries of the board,
   (D) an auto movable on said board, said auto having a pair of rear wheels and a single front wheel in the form of a socketed steel ball bearing which is attracted by said magnet to magnetically link said auto to said carriage whereby said auto is caused to follow suit, said rear wheels and ball bearing affording a three-point rolling support making it readily possible for the car to reverse direction, and
   (E) illumination means on said carriage indicating the position of said magnet to facilitate the proper placement of said auto, said means including a light bulb covered by a displaceable mask having an arrow-shaped aperture pointing to said magnet.
2. A simulator as set forth in claim 1, wherein said means to shift said carriage is provided with controls on a dashboard one control acting to shift the carriage in a horizontal direction, another independent control acting to shift the carriage in the A direction at right angles to said horizontal direction but in the same plane.
3. A simulator as set forth in claim 2, wherein said one control is a steering wheel.
4. A simulator as set forth in claim 2, wherein the other control is a movable stick.
5. A simulator as set forth in claim 1, further including a traffic light mounted on a post attached to a removable cover on said board to provide access to the illumination means.

References Cited

UNITED STATES PATENTS

| | | | |
|---|---|---|---|
| 2,639,545 | 5/1953 | Pastorius | 46—240 |
| 3,231,988 | 2/1966 | Freyde | 35—11 |
| 3,253,364 | 5/1966 | Hinkson | 46—240 |

LOUIS G. MANCENE, Primary Examiner

R. F. CUTTING, Assistant Examiner

U.S. Cl. X.R.

35—11